United States Patent
Maier et al.

(10) Patent No.: US 11,056,696 B2
(45) Date of Patent: Jul. 6, 2021

(54) SYSTEM FOR THE TREATMENT OF WATER

(71) Applicant: AUDI AG, Ingolstadt (DE)

(72) Inventors: Josef Maier, Walting (DE); Johannes Landgraf, Gaimersheim (DE); Benjamin Lemezys, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 156 days.

(21) Appl. No.: 16/025,763

(22) Filed: Jul. 2, 2018

(65) Prior Publication Data
US 2019/0006685 A1    Jan. 3, 2019

(30) Foreign Application Priority Data

Jul. 3, 2017 (DE) .................... 10 2017 211 268.9

(51) Int. Cl.
| | |
|---|---|
| *H01M 8/04* | (2016.01) |
| *H01M 8/04014* | (2016.01) |
| *B60S 1/50* | (2006.01) |
| *H01M 8/04119* | (2016.01) |
| *B60L 50/72* | (2019.01) |
| *H01M 8/04007* | (2016.01) |

(52) U.S. Cl.
CPC ......... *H01M 8/04164* (2013.01); *B60L 50/72* (2019.02); *B60S 1/50* (2013.01); *H01M 8/04014* (2013.01); *H01M 8/04059* (2013.01); *H01M 8/04141* (2013.01); *H01M 2250/20* (2013.01)

(58) Field of Classification Search
CPC ...... H01M 8/04; H01M 8/02; H01M 8/04119; B60L 11/18; B60S 1/50
See application file for complete search history.

(56) References Cited

U.S. PATENT DOCUMENTS

| | | | | |
|---|---|---|---|---|
| 5,662,184 A | * | 9/1997 | Riemer .................... | B60K 1/00 180/65.1 |
| 2006/0029849 A1 | * | 2/2006 | Metzler ............. | H01M 8/04029 429/414 |
| 2006/0141331 A1 | * | 6/2006 | Reiser ................. | H01M 8/0258 429/414 |
| 2007/0154757 A1 | * | 7/2007 | Okazaki .............. | H01M 8/1007 429/438 |
| 2009/0025566 A1 | | 1/2009 | Son et al. | |
| 2014/0216086 A1 | * | 8/2014 | Ohno ................... | B60H 1/3205 62/228.1 |

FOREIGN PATENT DOCUMENTS

| | | |
|---|---|---|
| DE | 10 2012 214 633 A1 | 2/2013 |
| DE | 10 2014 003 369 A1 | 9/2015 |
| JP | 2005-073463 A1 | 3/2005 |
| WO | 2014/131550 A1 | 9/2014 |

* cited by examiner

*Primary Examiner* — Kenneth J Douyette
(74) *Attorney, Agent, or Firm* — Seed Intellectual Property Law Group LLP

(57) ABSTRACT

The disclosure relates to a system for the treatment of water formed during an operation of at least one fuel cell of a vehicle, having a cavity, a condenser and an underbody-side system outer wall, and is designed to bound an underbody of the vehicle, wherein the condenser is arranged between the cavity and the underbody-side system outer wall, wherein the cavity is connected via an inlet to the at least one fuel cell, wherein, when the vehicle is in motion, the condenser is acted upon by air of an airflow and is cooled, wherein the condenser is designed to cool water which, originating from the at least one fuel cell, flows into the cavity.

18 Claims, 3 Drawing Sheets

SYSTEM FOR THE TREATMENT OF WATER

BACKGROUND

Technical Field

The disclosure relates to a system and a method for the treatment of water from at least one fuel cell of a vehicle.

Description of the Related Art

A vehicle that is powered by fuel cells has an exhaust system provided for this purpose with which water vapor from the fuel cells, which is for example at a temperature of approx. 60° C. to 70° C., is conveyed from a front end to a rear end of a vehicle and discharged. An exhaust system of this type is for example made from plastic and installed in the vehicle as a separate individual assembly. Furthermore, it is provided that the exhaust system has a constant downward slope or a drop. Moreover, reservoirs for water may be installed in the exhaust system, in which reservoirs water from the fuel cells is collected and regularly drained off.

However, for this purpose a plurality of individual components, an increase in the installation space required, increased costs, and an increased weight are to be expected. The components of the exhaust system are installed separately in the vehicle and mostly spaced closely to one another. Accordingly, the exhaust system has a complex design which is due inter alia to the requirement that the exhaust system is to be taken as far as the rear of the vehicle.

Integrating an exhaust gas path for fuel cells of a vehicle in an underbody of the vehicle is known from publication DE 10 2012 214 633 A1.

A fuel cell system for a vehicle is known from publication DE 10 2014 003 369 A1.

A further fuel cell system for a motor vehicle is described in publication WO 2014/131550 A1.

BRIEF SUMMARY

Against this background, one object was to treat water or water vapor from a fuel cell of a vehicle with minimal effort.

This object is solved by a system and a method with the features of the independent claims. Embodiments of the system and of the method arise from the dependent claims and the description.

The system according to the disclosure is designed for the treatment of water, that is, of vaporous and/or liquid water that is formed or is released during an operation of at least one fuel cell of a vehicle, and has a cavity, a condenser and an underbody-side system outer wall and is further designed to bound an underbody of the vehicle. The condenser is arranged between the cavity and the underbody-side system outer wall. The cavity is connected via an inlet to the at least one fuel cell. When the vehicle is in motion, the condenser is acted upon by air of an airflow and cooled, wherein the condenser is designed to condense or condense out water or water vapor and thus a vaporous part of the water which, originating from the at least one fuel cell, flows into the cavity.

As a rule, the system outer wall is designed simultaneously as condenser outer wall to enclose at least the condenser.

In an embodiment, the cavity and/or the condenser is or are arranged on an underbody-side vehicle outer wall of the vehicle, that is, arranged on or under this underbody-side vehicle outer wall. As a rule, the cavity is bounded and/or enclosed by at least a cavity outer wall which is also designed as part of the underbody-side vehicle outer wall.

It is also possible for an air duct with an inlet and an outlet to be arranged between the condenser and the system outer wall. In this case, the system outer wall, simultaneously functioning as air duct outer wall, is designed to enclose the air duct, wherein the air of the airflow flows through the air duct and cools the condenser.

The system has at least one condenser outer wall which encloses the condenser, wherein the condenser is arranged between the underbody-side vehicle outer wall and the at least one condenser outer wall. The air duct with the inlet and the outlet is arranged between the system outer wall and the condenser.

Furthermore, the at least one cavity outer wall has at least one opening, for example at least one perforation, through which for example cooled water leaves the cavity. The cavity outer wall is thereby arranged between the cavity and the condenser and connects the cavity to the condenser.

Moreover, it is provided that the condenser is connected to at least one further component of the vehicle. It is therefore possible to reuse the condensed water or the condensed water vapor, for example, to wet the at least one fuel cell and/or to supply the water to a tank of a windscreen wiper unit. To this end, the condenser has in one embodiment a collection tank for the condensed water.

Depending upon the definition, the cavity is arranged between a component of the vehicle, for example the underbody-side vehicle outer wall which bounds the vehicle, usually the underbody, and the condenser. If the system also has the air duct, it is possible that the system outer wall of the system, which encloses the air duct alongside the condenser, bounds the underbody or an underride protection of the vehicle, depending upon the definition.

The condenser is arranged between the cavity and the system outer wall or the air duct. In both cases it is possible for the condenser outer wall of the condenser, said wall separating the condenser from the airflow, to have pores. If the condenser is bounded by the condenser outer wall simultaneously designed as the system outer wall, the system outer wall will have pores. If the condenser outer wall is designed as a partition wall between the condenser and the air duct, said wall will have pores. In both cases it is possible for the water from the condenser to come into contact with the air of the airflow through the pores of the condenser outer wall and thereby evaporate. As a result of such an evaporation of the water, the condenser is additionally cooled.

The method according to the disclosure is provided for the treatment of water, which is liquid or vaporous and formed or released during an operation of at least one fuel cell of a vehicle, using a system having a cavity, a condenser and an underbody-side system outer wall, wherein an underbody of the vehicle is bounded by the system. The condenser is arranged between the cavity and the underbody-side system outer wall. Moreover, the cavity is connected via an inlet to the at least one fuel cell, wherein, when the vehicle is in motion, the condenser is acted upon by air of an airflow and cooled. In so doing, vaporous water, that is, water vapor, which forms during an operation of the at least one fuel cell of the vehicle and flows into the cavity, is condensed or condensed out by the condenser and thus cooled.

Here it is possible for the air of the airflow to be directed through an air duct of the system, which is arranged directly next to or under the condenser.

It is also possible that at least one part of the condensed water is reused for at least one further function of the vehicle.

Here at least one part of the condensed water is again supplied to the at least one fuel cell, wherein the at least one fuel cell is wetted by the at least one part of the cooled water.

In a further embodiment of the method, it is possible that water of the condenser, said water coming into contact with the air of the airflow through pores of a condenser outer wall of the condenser, is evaporated by the airflow, whereby the condenser is additionally cooled. Here it is also possible for this condenser to be connected to the at least one fuel cell via an external loop of a thermal management system, and cool said fuel cell. It is, however, also possible for the condenser, independently of such a thermal management system, to be designed only as a component of the system.

An exhaust system is thus integrated into the underbody or into the aerodynamic floor of the vehicle, said system having at least the cavity and the condenser as components, wherein the system designed as an exhaust system is designed to treat, that is, at least to recycle and/or cool water from the at least one fuel cell.

Depending upon the definition, it is also possible for the system to be integrated, for example, into a covering of the underbody and/or a so-called underride protection. Depending upon the embodiment of the system and/or definition, the condenser outer wall of the condenser simultaneously forms the system outer wall of the system and thus an additional outer wall for the vehicle. It is possible for the condenser to be connected, for example, to the loop of a thermal management system and be integrated into said system, which is, for example, also used to cool the at least one fuel cell. Water vapor, which flows into the cavity from an exhaust air of the at least one fuel cell, is condensed and used further, wherein it is, for example, possible to wet a cooling surface of the condenser with condensing water vapor, said surface usually bounding the cavity.

Furthermore, it is conceivable that water passes through pores on a condenser outer wall and then comes into contact with air from the airflow and is evaporated by the airflow. The water evaporated in this way creates an evaporative cooling whereby the condenser is in turn cooled.

It is possible here for the system to have the additional system outer wall, wherein this additional system outer wall and the condenser enclose the air duct, through which the airflow flows when the vehicle is in motion. A speed-dependent negative pressure is thereby created within the air duct, evaporated by the water, and a cooling effect for cooling the condenser is produced. It is thereby possible to control the airflow automatically or manually by means of flaps inside the air duct.

Water vapor, which as part of the method with the system is condensed to liquid water in the condenser, is in a possible embodiment collected and used to wet the at least one fuel cell or to fill a container for wiper water.

The exhaust system presented integrates a plurality of functions, namely a directing of exhaust gas comprising water vapor out of the at least one fuel cell, as well as a cooling of this exhaust gas, wherein otherwise customary components are dispensed with and an available cavity is optimally used for transporting the water. Furthermore, costs and weight are to be saved. By dint of early condensing out, the exhaust system can be shortened and end before a rear axle of the vehicle. Moreover, due to evaporation of the water resulting from an effect of the airflow, an additional cooling potential is to be realized which, with respect to a high cooling requirement of the at least one fuel cell, has a positive impact on its operation. Moreover, an emission of water or water vapor from the system is significantly reduced. If water from the at least one fuel cell is completely reused or recycled, it is possible that a vehicle having this system is also to be operated free of emissions which contain water. With the system presented, water vapor is effectively cooled. The system presented, by reason of its effective mode of operation, only requires minimal installation space so that, starting in a front-end region, it only extends as far as the middle of the vehicle.

With one possible realization of the system, it is provided that a covering of the underbody has a sandwich structure comprising, for example, the closed cavity and the condenser which are arranged one on top of the other. A connection of the system to a system comprising at least one fuel cell is, for example, realized via an interface in the front-end area of the cavity. In one embodiment, the at least one fuel cell of the vehicle is arranged in a vertical direction or z direction of the vehicle above the cavity and/or an inlet of the cavity. The interface is arranged in a vertical direction between the at least one fuel cell and the cavity. It is thus possible for water vapor from the at least one fuel cell to be conveyed into the cavity by the effect of gravity. It is possible here to connect the interface to the at least one fuel cell. This is to be ensured, for example, by a simple mounting.

To provide a cooling function for condensing the water vapor, cooling fins of the condenser are located below the cavity, said fins having air flowing around them when the vehicle is in motion. Furthermore, it is possible for the cavity or its at least one cavity outer wall to have on an underside at least one perforation through which vaporous water is removed, wherein this vaporous water is condensed on the cooling fins of the condenser and wets them. This condensed water is recycled and provided to a further component of the vehicle.

It goes without saying that the features mentioned above and the features yet to be explained below can be used not only in the respectively specified combination but also in other combinations or alone, without leaving the scope of the present disclosure.

BRIEF DESCRIPTION OF THE SEVERAL VIEWS OF THE DRAWINGS

The disclosure is illustrated schematically using embodiments in the drawings and is described schematically and in detail with reference to the drawings.

The figures are described coherently and comprehensively. The same reference numbers are assigned to the same components.

DETAILED DESCRIPTION

Figure 1:
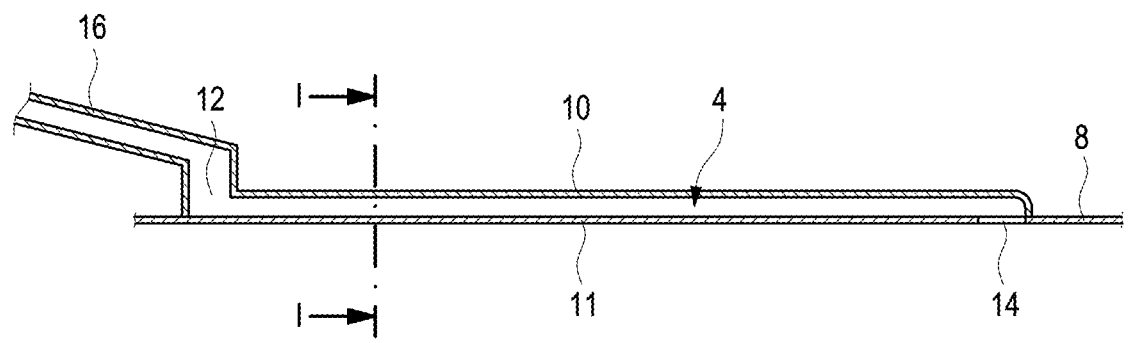
FIGS. 1a-1f show in schematic perspective details of a first embodiment of the system according to the disclosure from different perspectives.
Figure 1:
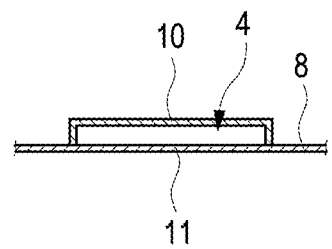
Figure 1:
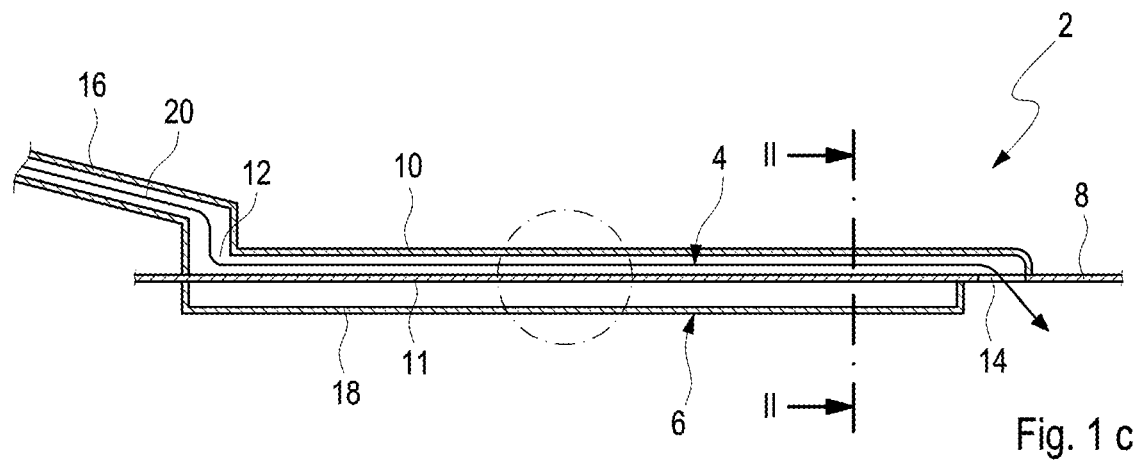
Figure 1:
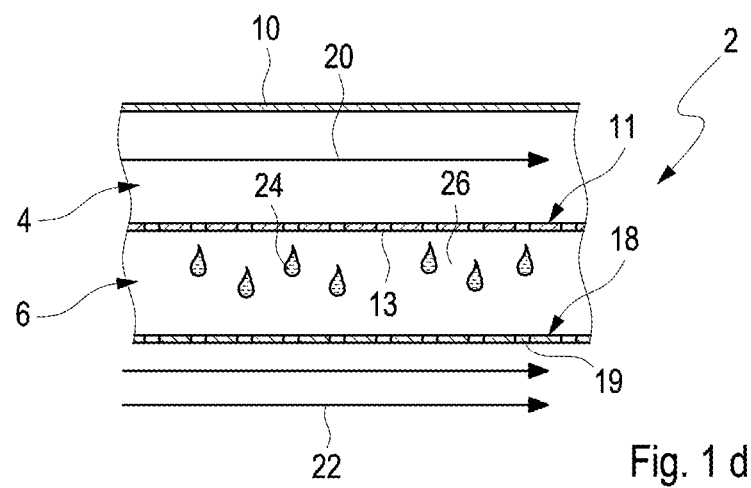
Figure 1E:
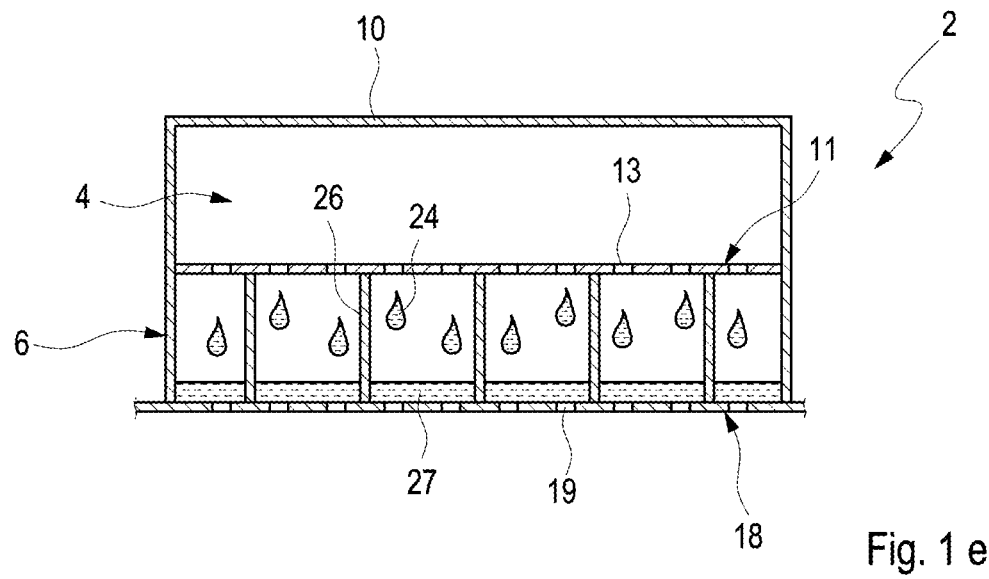
Figure 1F:
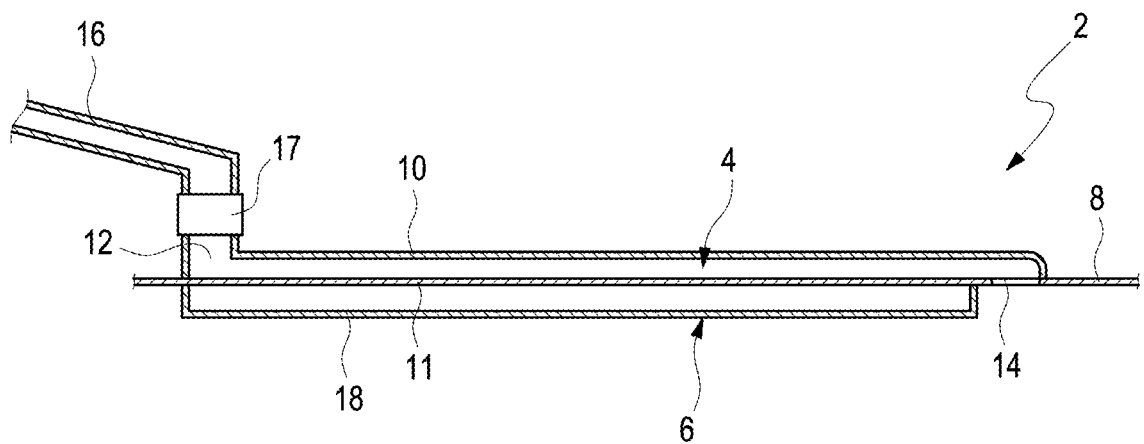

The first embodiment of the system 2 according to the disclosure is shown in full in FIG. 1c. FIG. 1d shows a first detail of the system 2 marked in FIG. 1c by a dashed circle. FIG. 1e shows a second detail from FIG. 1c along a section line II-II. This system 2 comprises a cavity 4 and a condenser 6. The cavity 4 is shown without the condenser 6 in FIG. 1a. FIG. 1b shows the cavity 4 in sectional view along a line I-I from FIG. 1a. As FIG. 1c shows, the condenser 6 is arranged between the vehicle outer wall 8 and a system outer wall 18, which simultaneously bounds the underbody of the vehicle. Figure 1f shows the complete system 2 from a second perspective.

Here, it is provided that the cavity 4 is arranged on an underbody-side vehicle outer wall 8 of the vehicle and is bounded by a first cavity outer wall 10 and a second cavity outer wall 11, which is designed as part of the underbody-side vehicle outer wall 8. The second cavity outer wall 11 has pores 13 which are discernible in FIG. 1e.

The cavity 4 has an inlet 12 and an outlet 14 as openings. The inlet 12 of the cavity 4 is connected here via an interface 16 to at least one fuel cell of the vehicle, wherein with the at least one fuel cell hydrogen and oxygen are converted to water, wherein electrical energy is generated. Moreover, in so doing, water with a temperature of approx. 60° C. to approx. 70° C. is produced, said water being at least partially present in vapor form or as water vapor. It is thereby possible for the interface 16 to be connected to the inlet 12 via a connecting element 17 (FIG. 1f).

In FIG. 1c, a flow of water is indicated by an arrow 20, said water flowing from the at least one fuel cell via the interface 16 and through the inlet 12 into the cavity 4. The vaporous water is thereby condensed and cooled by the condenser 6. It is provided that when the vehicle is in motion the condenser 6 is cooled by ambient air which flows past the system outer wall 18, and thus past the underbody of the vehicle, and which is indicated here by three arrows 22. It is moreover provided that water vapor 24 is transported out of the cavity 4 by pores in the second cavity outer wall 11, said pores being formed as part of the vehicle outer wall 8, and is condensed on cooling fins 26 of the condenser 6 to liquid water or product water 27, which is also shown in FIG. 1e.

It is also provided that the system outer wall 18 is designed simultaneously as condenser outer wall of the condenser 6 and has pores 19. Condensed, liquid product water 27 leaves through these pores 19 and is evaporated by the airflow, whereby the condenser 6 is cooled by an evaporative cooling of the water.

In an alternative embodiment of the system, it is conceivable that the cavity is arranged under the underbody-side vehicle outer wall and is upwardly bounded by the underbody-side vehicle outer wall, which at least in sections forms a first cavity outer wall, as well as underneath by a second cavity outer wall, which has pores, wherein this second cavity outer wall is arranged between the cavity and the condenser. In this alternative embodiment of the system, as well as in the first embodiment of system 2 from FIG. 1, it is provided that the cavity 4 and the condenser 6 are arranged on the underbody-side vehicle outer wall 8 and therefore in the underbody.

Figure 2:
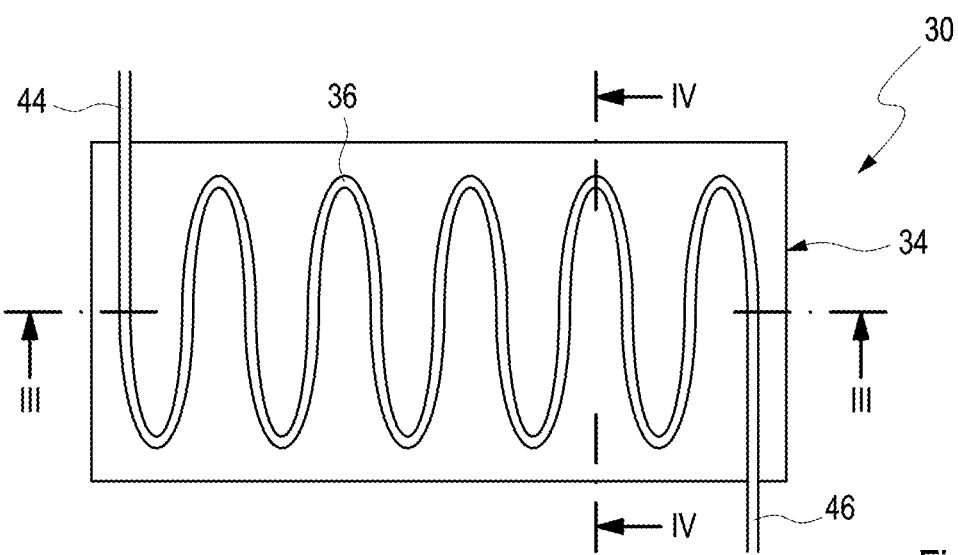
FIGS. 2a-2c show in schematic perspective a second embodiment of the system according to the disclosure from different perspectives.
Figure 2:
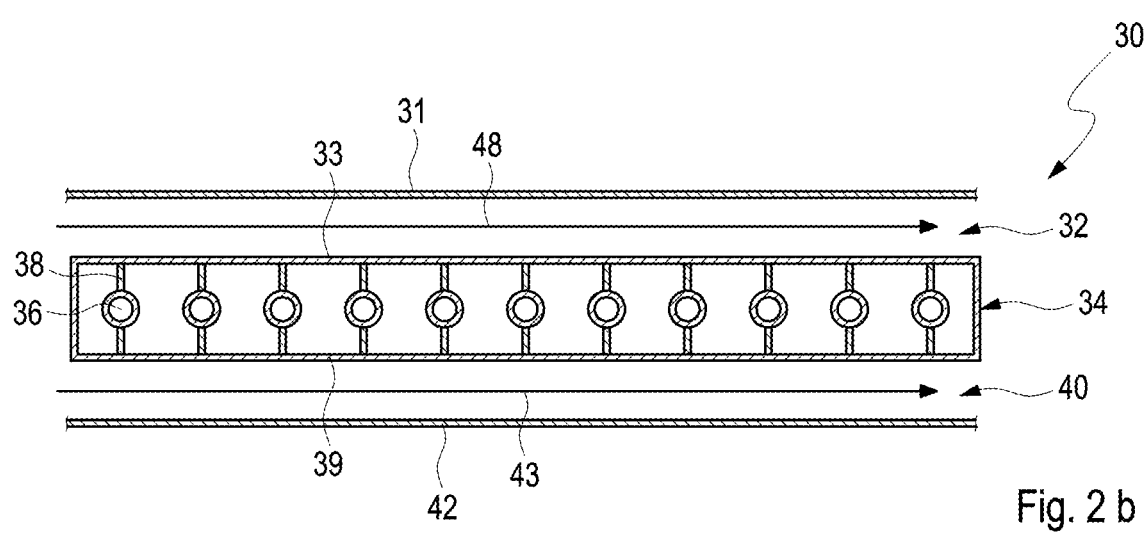
Figure 2:
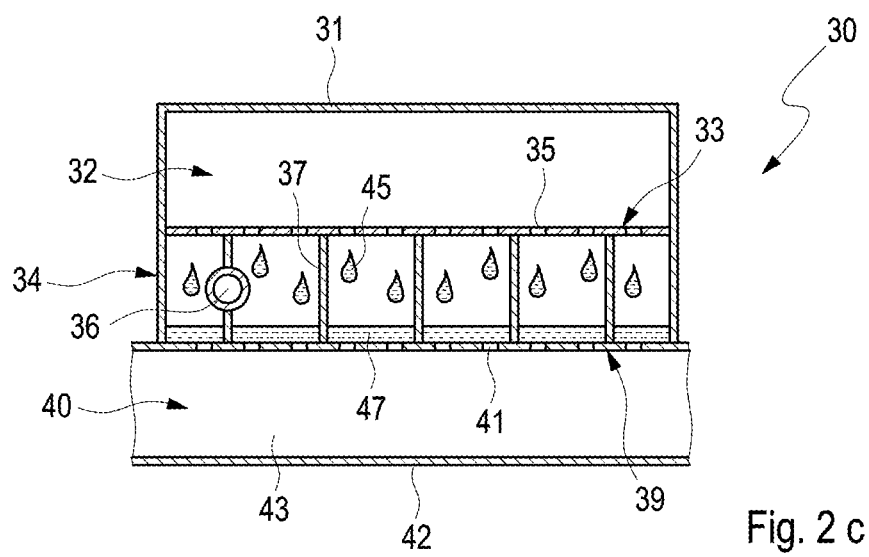

FIG. 2a shows a condenser 34 of the second embodiment of the system 30 from above, wherein it can be seen here that a cooling duct 36 is connected via two connections 44, 46 to a loop of a thermal management system. FIG. 2b shows a detail of the system 30 along a section line from FIG. 2a. FIG. 2c shows the system 30 along a section line IV-IV from FIG. 2a.

The second embodiment of the system 30 for a vehicle is shown schematically in FIG. 2b. This system 30 also comprises a cavity 32, the condenser 34 with cooling ducts 36 and cooling ribs 38 and an air duct 40, wherein the condenser 34 is arranged between the cavity 32 and the air duct 40, wherein the system 30 is bounded here by an underbody-side system outer wall 42, which simultaneously forms an underride protection plate of an underbody of the vehicle.

The cavity 32 is bounded by a first cavity outer wall 31 and a second cavity outer wall 33, which is simultaneously formed as first condenser outer wall of the condenser 34 and has pores 35. The condenser 34 further has cooling fins 37 and a second condenser outer wall 39 which separates the condenser 34 from the air duct 40. This second condenser outer wall 39 thereby also has pores 41.

During an operation of the system 30, it is provided that exhaust air and water vapor 45 from at least one fuel cell of the vehicle are directed through the cavity 32, which is indicated in FIG. 2b by an arrow 48. Furthermore, when the vehicle is in motion, the result is that ambient air 43 flows through the air duct 40. This results in the condenser 34 being cooled by the ambient air 43. Moreover, it is provided that water vapor 45 is transported out of the at least one fuel cell and into the condenser 34 by pores 35 in the second cavity outer wall 33. In so doing, water vapor 45 from the at least one fuel cell condenses here on the cooling ribs 38 and cooling fins 37 of the condenser 34 to liquid product water 47 and is recycled. Furthermore, liquid water or product water 47 evaporates through the pores 41 of the second condenser outer wall 39 of the condenser 34 into the air duct 40 and is evaporated by the flowing ambient air 43, whereby an evaporative cooling ensues with which the condenser 34 is additionally cooled.

German patent application no. 10 2017 211268.9, filed Jul. 3, 2017, is hereby incorporated herein by reference in its entirety. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for the treatment of water formed during an operation of at least one fuel cell of a vehicle, the system comprising:
   a cavity, a condenser, and an underbody-side system outer wall,
   wherein the system is designed to bound an underbody of the vehicle,
   wherein the condenser is arranged between the cavity and the underbody-side system outer wall,
   wherein the cavity is connected via an inlet to the at least one fuel cell,
   wherein the condenser is designed to condense water vapor which, originating from the at least one fuel cell, flows into the cavity;
   wherein, when the vehicle is in motion, the condenser is acted upon by air of an ambient airflow from underneath the vehicle and is cooled, the water condensed by the condenser is evaporated away from the condenser, and the condenser is cooled by evaporative cooling.

2. The system according to claim 1, wherein the system outer wall is a condenser outer wall to enclose at least the condenser.

3. The system according to claim 1, wherein an air duct with an inlet and an outlet is arranged between the condenser and the system outer wall, wherein the system outer wall is designed to enclose the air duct, and wherein the air of the airflow flows through the air duct.

4. The system according to claim 1, wherein the condenser is connected to at least one further component of the vehicle.

5. A method for the treatment of water formed during an operation of at least one fuel cell of a vehicle, the method comprising:
   using a system having a cavity, a condenser and an underbody-side system outer wall,
   wherein an underbody of the vehicle is bounded by the system,
   wherein the condenser is arranged between the cavity and the underbody-side system outer wall,
   wherein the cavity is connected via an inlet to the at least one fuel cell,
   wherein water vapor originating from the at least one fuel cell flows into the cavity and is condensed by the condenser; and
   wherein, when the vehicle is in motion, the condenser is acted upon by air of an ambient airflow from underneath the vehicle and is cooled, the water condensed by the condenser is evaporated away from the condenser, and the condenser is cooled by evaporative cooling.

6. The method according to claim 5, wherein air of the airflow is guided through an air duct of the system.

7. The method according to claim 5, wherein at least one part of the condensed water is supplied to the at least one fuel cell, wherein the at least one fuel cell is wetted by the at least one part of the condensed water.

8. The method according to claim 5, wherein at least one part of the water leaves the condenser through pores of a condenser outer wall of the condenser, and air of the airflow flows past the condenser outer wall, thereby cooling the condenser.

9. A system comprising:
   a vehicle including a fuel cell having a water outlet;
   a cavity fluidly coupled to the water outlet of the fuel cell to receive water generated within the fuel cell;
   a condenser coupled to the cavity, wherein the condenser is designed to condense water vapor which, originating from the fuel cell, flows into the cavity;
   a first porous wall that forms an outer wall of the cavity, that forms a first outer wall of the condenser, that separates the cavity from the condenser, and that allows water to move from the cavity to the condenser;
   a second porous wall that forms a second outer wall of the condenser, wherein the second porous wall is exposed to environmental air underneath the vehicle such that, when the vehicle is in motion, the environmental air cools the condenser, the water condensed by the condenser is evaporated away from the condenser, and the condenser is cooled by evaporative cooling; and
   an underbody-side system outer wall, wherein the condenser is arranged between the cavity and the underbody-side system outer wall.

10. The system of claim 9 wherein the condenser extends along an underside of the vehicle.

11. The system of claim 9 wherein the fuel cell has a water inlet and the condenser is fluidly coupled to the water inlet of the fuel cell to provide water to the fuel cell.

12. The system of claim 9 wherein the vehicle has a windscreen wiper unit including a water tank and the condenser is fluidly coupled to the tank to provide water to the tank.

13. The system of claim 9 wherein the cavity is fluidly coupled to the water outlet of the fuel cell to receive liquid water from the fuel cell.

14. The system of claim 9 wherein the cavity is fluidly coupled to the water outlet of the fuel cell to receive water vapor from the fuel cell.

15. The system of claim 9, further comprising an air duct coupled to the condenser to carry the environmental air past the second porous wall.

16. The system of claim 15 wherein the air duct is located below the condenser.

17. The system of claim 9 wherein the fuel cell is located above the cavity.

18. The system of claim 9 wherein the cavity is located above the condenser.

* * * * *